(12) United States Patent
Geng et al.

(10) Patent No.: US 9,090,489 B2
(45) Date of Patent: Jul. 28, 2015

(54) METHOD FOR REMOVING GENES ENCODING ANTIBIOTIC RESISTANCE

(71) Applicant: Nanjing University, Nanjing (CN)

(72) Inventors: Jinju Geng, Nanjing (CN); Hongqiang Ren, Nanjing (CN)

(73) Assignee: Nanjing University, Nanjing (CN)

( * ) Notice: Subject to any disclaimer, the term of this patent is extended or adjusted under 35 U.S.C. 154(b) by 231 days.

(21) Appl. No.: 13/853,082

(22) Filed: Mar. 29, 2013

(65) Prior Publication Data
US 2014/0124440 A1    May 8, 2014

(30) Foreign Application Priority Data
Mar. 29, 2012 (CN) .......................... 2012 1 0086161

(51) Int. Cl.
C02F 3/30    (2006.01)
(52) U.S. Cl.
CPC ........................................ *C02F 3/30* (2013.01)

(58) Field of Classification Search
CPC .......................................................... C02F 3/30
USPC ........................................ 210/605, 631, 906
See application file for complete search history.

(56) References Cited

U.S. PATENT DOCUMENTS

| 5,932,099 | A  | * | 8/1999 | Cote et al. | 210/605 |
| 6,015,496 | A  | * | 1/2000 | Khudenko | 210/603 |
| 7,691,269 | B2 | * | 4/2010 | Cort | 210/620 |
| 2010/0219126 | A1 | * | 9/2010 | Baba et al. | 210/616 |
| 2012/0205317 | A1 | * | 8/2012 | Ren et al. | 210/724 |

* cited by examiner

*Primary Examiner* — Fred Prince
(74) *Attorney, Agent, or Firm* — Matthias Scholl P.C.; Matthias Scholl

(57) ABSTRACT

A method for removing antibiotic resistance genes (ARGs). The method includes the following steps: 1) coagulation and sedimentation of waste water; 2) biochemical treatment; 3) disinfection by peracetic acid; 4) sterilization by high pressure $CO_2$; 5) photocatalysis by nano-titanium dioxide ($TiO_2$); and 6) depositing.

3 Claims, No Drawings

METHOD FOR REMOVING GENES ENCODING ANTIBIOTIC RESISTANCE

CROSS-REFERENCE TO RELATED APPLICATIONS

Pursuant to 35 U.S.C. §119 and the Paris Convention Treaty, this application claims the benefit of Chinese Patent Application No. 201210086161.8 filed Mar. 29, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for removing antibiotic resistance genes (ARGs) from wastewater.

2. Description of the Related Art

Extensive use or abuse of antibiotics has resulted in more and more serious problems of environmental pollution. Selective pressure imposed by the antibiotics is capable of inducing animal microorganisms or environmental microorganisms to produce antibiotic resistance genes (ARGs), which seriously threatens ecological environmental security and human health. ARGs are capable of horizontally transferring among floras of the same or different species via plasmid, integration-gene cassette, transposon, and other mobile genetic elements. Characterized in persistence and replicability in the environment, ARGs have been considered to be a new type of environmental pollutants.

A waste water treatment system is a main way for the antibiotic resistance genes to enter the water environment. The antibiotic resistance genes enter the water environment via medical waste water, pharmaceutical waste water, farm sewage, and domestic sewage. Because a conventional waste water treatment technology has no obvious effect in removing many antibiotics and antibiotic resistance genes, the treated water still contains a considerable number of resistance genes.

Outlet water from the waste water treatment plant and sludge applied to soil are considered to be important resources of antibiotic resistance genes distributed in the surface water, soil water, and groundwater. The use of ARGs molecular tags for tracing the source of the antibiotic resistance genes has proved that resistance genes of antibiotics relevant to human diseases are mainly from waste water treatment plants rather than nearby livestock farms or upper rivers. Thus, the removal of the resistance genes or resistant bacteria can be realized by focusing on safe recovery of the waste water; and the sterilization of the waste water is a necessary process for improving the safety and quality of the water.

SUMMARY OF THE INVENTION

In view of the above-described problems, it is one objective of the invention to provide a method for removing antibiotic resistance genes (ARGs). The method of the invention is capable of effectively removing antibiotic resistance genes, and provides technical support for advanced waste water treatment, and improves the safety and quality of the water.

To achieve the above objective, in accordance with one embodiment of the invention, there is provided a method for removing antibiotic resistance genes (ARGs), the method comprising the following steps:

1) coagulation and sedimentation introducing waste water into a coagulation and sedimentation tank; coagulating and depositing the waste water using polyaluminumchloride (PAC) as a flocculate and polyacrylamide (PAM) as a coagulant, a dosage of the flocculate being 3-5 mg per liter of the waste water, and a dosage of the coagulant being 1-3 mg per liter of the waste water; and introducing a supernatant after deposition into a sand filter for further lowering a water turbidity;

2) biochemical treatment conducting an anaerobic-anoxic-oxic ($A^2/O$) activated sludge process to remove nitrogen and phosphorus from the waste water after sand filtering in step 1) and to lower a chemical oxygen demand (COD); and introducing the water into a secondary sedimentation tank for slurry separation;

3) disinfection by peracetic acid pumping the waste water after the biochemical treatment from the secondary sedimentation tank into a sterilization tower; and disinfecting the water using peracetic acid for 10 min, a dosage of peracetic acid being 80-100 mg/L;

a preparation of peracetic acid comprising the following steps: inputting glacial acetic acid into a barrel, mixing glacial acetic acid with 2% of sulfuric acid; adding 30% of hydrogen peroxide, a dosage ratio between hydrogen peroxide and glacial acetic acid being 1:2, and adding 1 g/L of phosphoric acid having a concentration of 0.1% as a stabilizer to form peracetic acid; and preserving peracetic acid at a room temperature for 2 days;

4) sterilization by high pressure $CO_2$ injecting $CO_2$ gas having a pressure of 0.5-1.5 mPa into the sterilization tower, and maintaining the high pressure $CO_2$ to sterilize for 5-10 min, the $CO_2$ gas being output from a high pressure $CO_2$ cylinder, passing through a pressure reducing valve and a high pressure pipeline, and finally into the sterilization tower from microporous aeration tubes arranged at a bottom of the sterilization tower;

5) photocatalysis by nano-titanium dioxide ($TiO_2$)

introducing the water after the sterilization into a nano-$TiO_2$ photocatalytic oxidation pool; the photocatalytic oxidation pool being provided with a spherical nano-$TiO_2$ suspension filler comprising a nuclear body and a coating; a nano-$TiO_2$ coating being coated on the nuclear body; the nuclear body being made of a polyethylene material by one step injection molding; a radius of the nuclear body being between 3 and 10 cm; the coating being formed by dip coating $TiO_2$ powder having a grain size of not exceeding 100 nm; a thickness of the coating being between 0.05 and 0.45 mm; and a gravity of the spherical nano-$TiO_2$ suspension filler being 95-99.8% of a gravity of water;

meanwhile, tilting a plurality of three-layered nano-$TiO_2$ meshes for 30° in the sedimentation tank to oxidize, decompose, degrade, and remove resistant genes from the waste water under daylight or ultraviolet irradiation; and the nano-$TiO_2$ mesh being formed by coating a layer of nano-$TiO_2$ onto a stainless steel mesh; and 6) depositing the water for 1 h after step 5), finely filtering the water to remove impurities.

In a class of this embodiment, the flocculant in step 1) is a polymeric ferric sulfuric solution. The coagulant is a mixture of a poly diallyl dimethyl ammonium chloride, a polyaluminum chloride, aluminum sulfate, and ferric chloride having a ratio of 3:2:1:1. A dosage of the coagulant is 20-150 mg/L.

In a class of this embodiment, the nuclear body of the spherical nano-$TiO_2$ suspension filler is in a shape of an ellipsoid, a hollow sphere, a cube, and a cuboid.

Advantages of the invention are summarized as follows:

The method meets demands of advanced waste water treatment, water reuse, economic promotion, and social and environmental sustainability. The method focuses on toxic pollutants-antibiotic resistance genes and pathogenic microorganisms in waste water treatment; uses a combination of advanced technologies, and employs carbon dioxide sterilization technology in the waste water treatment. Thus, the method effectively removes resistant genes, and provides technical support for advanced waste water treatment and the safety and quality of the water.

DETAILED DESCRIPTION OF THE EMBODIMENTS

For further illustrating the invention, experiments detailing a method for removing antibiotic resistance genes (ARGs) are described below. It should be noted that the following examples are intended to describe and not to limit the invention.

Example 1

A method for removing antibiotic resistance genes (ARGs), comprises the following steps:

1) Coagulation and sedimentation

Introduce waste water into a coagulation and sedimentation tank, coagulate and deposit the waste water by using a flocculate PAC and a coagulant PAM. A dosage of the flocculate PAC is 5 mg per liter of the waste water, and a dosage of the coagulant PAM is 3 mg per liter of the waste water. Introduce a supernatant after deposition into a sand filter to further lower a water turbidity.

2) Biochemical treatment

Conduct an anaerobic-anoxic-oxic ($A^2$/O) activated sludge process to remove nitrogen and phosphorus from the water after sand filtering in step 1) and to lower a chemical oxygen demand (COD); and introduce the water into a secondary sedimentation tank for slurry separation.

3) Disinfection by peracetic acid

Pump the water after the biochemical treatment from the secondary sedimentation tank into a sterilization tower; disinfect the water by using peracetic acid for 10 min. A dosage of peracetic acid is 100 mg/L.

The preparation of peracetic acid comprises the following steps: input glacial acetic acid into a barrel; mix glacial acetic acid with 2% sulfuric acid; add 30% hydrogen peroxide (a dosage ratio between hydrogen peroxide and glacial acetic acid is 1:2), and add 1 g/L of phosphoric acid having a concentration of 0.1% as a stabilizer to form peracetic acid; and preserve peracetic acid at a room temperature for 2 days.

4) Sterilization by high pressure $CO_2$

Inject $CO_2$ gas having a pressure of 1.5 mPa into the sterilization tower in step 3). The $CO_2$ gas is output from a high pressure $CO_2$ cylinder, passes through a pressure reducing valve and a high pressure pipeline, and finally into the sterilization tower from microporous aeration tubes arranged at a bottom of the sterilization tower. Distribute the $CO_2$ gas in the water for sterilization; and maintain a time of the high pressure $CO_2$ sterilization for 10 min 5) Photocatalysis by nano-titanium dioxide ($TiO_2$)

Introduce the water after the high pressure $CO_2$ sterilization into a nano-$TiO_2$ photocatalytic oxidation pool. The photocatalytic oxidation pool is provided with a spherical nano-$TiO_2$ suspension filler comprising a nuclear body and a coating. A layer of nano-$TiO_2$ is coated on the nuclear body. The nuclear body is made of a polyethylene material by one step injection molding. A radius of the nuclear body is 3-10 cm. The coating is formed by dip coating $TiO_2$ powder having a grain size of no exceeding 100 nm. A thickness of the coating is 0.05-0.45 mm. A specific gravity of the spherical nano-$TiO_2$ suspension filler is 95-99.8% of a specific gravity of water.

The surface of the spherical nano-$TiO_2$ suspension filler is coated with the layer of the nano-$TiO_2$. $TiO_2$ belongs to an N-type semiconductor. According to a theory of photocatalysis: the N-type semiconductor material has discontinuous energy bands, that is, a forbidden band exists between a valence band and a conduction band. When oxide semiconductor particles are irradiated by photons having energy larger than a width of the forbidden band, electrons jump from the valence band to the conduction band, thereby producing electron-hole pairs. The electrons have reducibility, and the holes have oxidation. The holes are in contact with $OH^-$ arranged on a surface of the oxide semiconductor particle and produce OH free radicals having a strong oxidation. The active OH free radicals oxidize many refractory organic matters into inorganic matters, such as $CO_2$ and $H_2O$.

Chemical equation is summarized as follows:

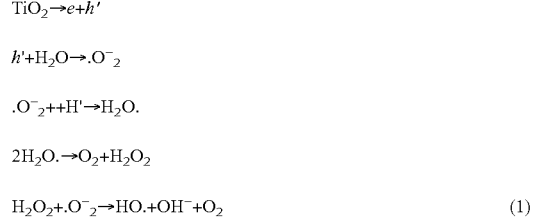

$$H_2O_2 + .O^-_2 \rightarrow HO. + OH^- + O_2 \quad (1)$$

Meanwhile, tilt a plurality of three-layered nano-$TiO_2$ meshes for 30° in the sedimentation tank to oxidize, decompose, degrade, and remove resistant genes from the waste water under the day light, ultraviolet irradiation of cloudy day and a time after the sunset.

The nano-$TiO_2$ mesh is formed by coating a layer of nano-$TiO_2$ onto a stainless steel mesh.

6) deposit the water for 1 h after step 5), finely filter the water to remove remaining impurities.

The flocculant in step 1) is a polymeric ferric sulfuric solution. The coagulant is a mixture of a poly diallyl dimethyl ammonium chloride, a polyaluminum chloride, aluminum sulfate, and ferric chloride having a ratio of 3:2:1:1.

A I-type integron (incI 1), a sulfa resistance gene (sul I, sul II, sul III), and a tetracycline resistance gene (tet A, tet M, tet W, tet Q) in an outlet water are shown in Table 1:

TABLE 1

| | intI 1 | sul I | sul II | sul III | tet A | tet M | tet M | tet W |
|---|---|---|---|---|---|---|---|---|
| Inlet water quality index(copies/ml) | $7.5 \times 10^8$ | $3.6 \times 10^9$ | $4.2 \times 10^7$ | $5.4 \times 10^7$ | $5.1 \times 10^5$ | $2.2 \times 10^4$ | $8.9 \times 10^7$ | $3.4 \times 10^5$ |
| Killing rate/lg | 7.75 | 8.64 | 6.87 | 6.52 | 4.99 | 4.00 | 6.87 | 4.32 |

Example 2

A method for removing antibiotic resistance genes (ARGs), comprising the following steps:

1) Coagulation and sedimentation

Introduce waste water into a coagulation and sedimentation tank, coagulate and deposit the waste water by using a flocculate PAC and a coagulant PAM. A dosage of the flocculate PAC is 3 mg per liter of the waste water, and a dosage of the coagulant PAM is 1 mg per liter of the waste water. Introduce a supernatant after deposition into a sand filter to further lower a water turbidity.

2) Biochemical treatment

Conduct an anaerobic-anoxic-oxic ($A^2/O$) activated sludge process to remove nitrogen and phosphorus from the water after sand filtering in step 1) and to lower a chemical oxygen demand (COD); and introduce the water into a secondary sedimentation tank for slurry separation.

3) Disinfection by peracetic acid

Pump the water after the biochemical treatment from the secondary sedimentation tank into a sterilization tower; disinfect the water by using peracetic acid for 10 min. A dosage of peracetic acid is 80 mg/L.

A preparation of peracetic acid comprises the following steps: input glacial acetic acid into a barrel; mix glacial acetic acid with 2% sulfuric acid; add 30% hydrogen peroxide (a dosage ratio between hydrogen peroxide and glacial acetic acid is 1:2), and add 1 g/L of phosphoric acid having a concentration of 0.1% as a stabilizer to form peracetic acid; and preserve peracetic acid at a room temperature for 2 days.

4) Sterilization by high pressure $CO_2$

Inject $CO_2$ gas having a pressure of 0.5-1.5 mPa into the sterilization tower in step 3). The $CO_2$ gas is output from a high pressure $CO_2$ cylinder, passes through a pressure reducing valve and a high pressure pipeline, and finally into the sterilization tower from microporous aeration tubes arranged at a bottom of the sterilization tower. Distribute the $CO_2$ gas in the water for sterilization; and maintain a time of the high pressure $CO_2$ sterilization for 5 min.

5) Photocatalysis by nano-titanium dioxide ($TiO_2$)

Introduce the water after the high pressure $CO_2$ sterilization into a nano-$TiO_2$ photocatalytic oxidation pool. The photocatalytic oxidation pool is provided with a spherical nano-$TiO_2$ suspension filler comprising a nuclear body and a coating. A layer of nano-$TiO_2$ is coated on the nuclear body. The nuclear body is made of a polyethylene material by one step injection molding. A radius of the nuclear body is 3-10 cm. The coating is formed by dip coating $TiO_2$ powder having a grain size of no exceeding 100 nm. A thickness of the coating is 0.05-0.45 mm. A specific gravity of the spherical nano-$TiO_2$ suspension filler is 95-99.8% of a specific gravity of water.

The surface of the spherical nano-$TiO_2$ suspension filler is coated with the layer of the nano-$TiO_2$. $TiO_2$ belongs to an N-type semiconductor. According to a theory of photocatalysis: the N-type semiconductor material has discontinuous energy bands, that is, a forbidden band exists between a valence band and a conduction band. When oxide semiconductor particles are irradiated by photons having energy larger than a width of the forbidden band, electrons jump from the valence band to the conduction band, thereby producing electron-hole pairs. The electrons have reducibility, and the holes have oxidation. The holes are in contact with $OH^-$ arranged on a surface of the oxide semiconductor particle and produce OH free radicals having a strong oxidation. The active OH free radicals oxidize many refractory organic matters into inorganic matters, such as $CO_2$ and $H_2O$.

Chemical equation is summarized as follows:

$$TiO_2 \rightarrow\!\!> e + h'$$

$$h' + H_2O \rightarrow .O^-_2$$

$$.O^-_2 + +H' \rightarrow H_2O.$$

$$2H_2O. \rightarrow O_2 + H_2O_2$$

$$H_2O_2 + .O^-_2 \rightarrow HO. + OH^- + O_2 \qquad (1)$$

Meanwhile, tilt a plurality of three-layered nano-$TiO_2$ meshes for 30° in the sedimentation tank to oxidize, decompose, degrade, and remove resistant genes from the waste water under the day light, ultraviolet irradiation of cloudy day and a time after the sunset.

The nano-$TiO_2$ mesh is formed by coating a layer of nano-$TiO_2$ onto a stainless steel mesh.

6) deposit the water for 1 h after step 5), finely filter the water to remove remaining impurities.

The flocculant in step 1) is a polymeric ferric sulfuric solution. The coagulant is a mixture of a poly diallyl dimethyl ammonium chloride, a polyaluminum chloride, aluminum sulfate, and ferric chloride having a ratio of 3:2:1:1. A dosage of the coagulant is 20-150 mg/L.

A I-type integron (incI 1), a sulfa resistance gene (sul I, sul II, sul III), and a tetracycline resistance gene (tet A, tet M, tet W, tet Q) in an outlet water are shown in Table 2:

TABLE 2

| | intI 1 | sul I | sul II | sul III | tet A | tet M | tet M | tet W |
|---|---|---|---|---|---|---|---|---|
| Inlet water quality index(copies/ml) | $3.3 \times 10^5$ | $3.2 \times 10^6$ | $5.6 \times 10^6$ | $1.9 \times 10^3$ | $2.1 \times 10^4$ | $6.9 \times 10^4$ | $6.3 \times 10^4$ | $5.4 \times 10^2$ |
| Killing rate/lg | 4.75 | 5.94 | 5.86 | 2.72 | 3.99 | 3.95 | 3.87 | 1.99 |

Preferably, add an adsorption column comprising an adsorbent as an end of the biochemical treatment in step 2) to adsorb soluble microbial products (SMP) in the water to be treated; and steps 3)-6) are followed until the recovered water is obtained.

The adsorbent is a nano-superfine powder adsorbent. The nanometer superfine powder adsorbent is prepared by using the following ingredients: 10-25 weight parts of a trimethylsilyl cage polysilsesquioxane, 5-10 weight parts of a nano-active carbon powder, 5-10 weight parts of a nano-diatomaceous earth, 18-28 weight parts of a active clay. The above ingredients are mixed at a room temperature to form the nano-superfine powder adsorbent.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for removing antibiotic resistance genes (ARGs), the method comprising the following steps:
   1) coagulation and sedimentation
       introducing waste water into a coagulation and sedimentation tank; coagulating and depositing the waste water using polyaluminumchloride (PAC) as a flocculate and polyacrylamide (PAM) as a coagulant, a dosage of the flocculate being 3-5 mg per liter of the waste water, and a dosage of the coagulant being 1-3 mg per liter of the waste water; and introducing a supernatant after deposition into a sand filter for further lowering a water turbidity;
   2) biochemical treatment
       conducting an anaerobic-anoxic-oxic ($A^2/O$) activated sludge process to remove nitrogen and phosphorus from the waste water after sand filtering in step 1) and to lower a chemical oxygen demand (COD); and introducing the water into a secondary sedimentation tank for slurry separation;
   3) disinfection by peracetic acid
       pumping the waste water after the biochemical treatment from the secondary sedimentation tank into a sterilization tower; and disinfecting the water using peracetic acid for 10 min, a dosage of peracetic acid being 80-100 mg/L, and a preparation of peracetic acid comprising the following steps: inputting glacial acetic acid into a barrel, mixing glacial acetic acid with 2% of sulfuric acid; adding 30% of hydrogen peroxide, a dosage ratio between hydrogen peroxide and glacial acetic acid being 1:2, and adding 1 g/L of phosphoric acid having a concentration of 0.1% as a stabilizer to form peracetic acid; and preserving peracetic acid at a room temperature for 2 days;
   4) sterilization by high pressure $CO_2$
       injecting $CO_2$ gas having a pressure of 0.5-1.5 mPa into the sterilization tower, and maintaining the high pressure $CO_2$ to sterilize for 5-10 min, the $CO_2$ gas being output from a high pressure $CO_2$ cylinder, passing through a pressure reducing valve and a high pressure pipeline, and finally into the sterilization tower from microporous aeration tubes arranged at a bottom of the sterilization tower;
   5) photocatalysis by nano-titanium dioxide ($TiO_2$)
       introducing the water after the sterilization into a nano-$TiO_2$ photocatalytic oxidation pool, and tilting a plurality of three-layered nano-$TiO_2$ meshes for 30° in the sedimentation tank to oxidize, decompose, degrade, and remove resistant genes from the waste water under daylight or ultraviolet irradiation, the photocatalytic oxidation pool being provided with a spherical nano-$TiO_2$ suspension filler comprising a nuclear body and a coating; a nano-$TiO_2$ coating being coated on the nuclear body; the nuclear body being made of a polyethylene material by one step injection molding; a radius of the nuclear body being between 3 and 10 cm; the coating being formed by dip coating $TiO_2$ powder having a grain size of not exceeding 100 nm; a thickness of the coating being between 0.05 and 0.45 mm; and a gravity of the spherical nano-$TiO_2$ suspension filler being 95-99.8% of a gravity of water; and the nano-$TiO_2$ mesh being formed by coating a layer of nano-$TiO_2$ onto a stainless steel mesh; and
   6) depositing the water for 1 h after step 5), finely filtering the water to remove impurities.

2. The method of claim 1, wherein
the flocculant in step 1) is a polymeric ferric sulfuric solution;
the coagulant is a mixture of a poly diallyl dimethyl ammonium chloride, a polyaluminum chloride, aluminum sulfate, and ferric chloride having a ratio of 3:2:1:1; and
a dosage of the coagulant is 20-150 mg/L.

3. The method of claim 1, wherein the nuclear body of the spherical nano-$TiO_2$ suspension filler is in the shape of an ellipsoid, a hollow sphere, a cube, or a cuboid.

* * * * *